(12) United States Patent
Chess

(10) Patent No.: US 6,192,512 B1
(45) Date of Patent: Feb. 20, 2001

(54) INTERPRETER WITH VIRTUALIZED INTERFACE

(75) Inventor: David M Chess, Mohegan Lake, NY (US)

(73) Assignee: International Business Machines Corporation, Armonk, NY (US)

(*) Notice: Under 35 U.S.C. 154(b), the term of this patent shall be extended for 0 days.

(21) Appl. No.: 09/160,117

(22) Filed: Sep. 24, 1998

(51) Int. Cl.$^7$ ............................... G06F 9/45; G06F 11/30

(52) U.S. Cl. ................................ 717/5; 717/4; 714/38; 709/328; 713/200

(58) Field of Search ...................... 395/704, 705; 717/5, 4; 714/37; 709/328; 713/200

(56) References Cited

U.S. PATENT DOCUMENTS

| | | | |
|---|---|---|---|
| 5,440,723 | 8/1995 | Arnold et al. | 714/2 |
| 5,452,442 | 9/1995 | Kephart | 714/38 |
| 5,475,843 | * 12/1995 | Halviatti et al. | 717/4 |
| 5,485,575 | 1/1996 | Chess et al. | 714/38 |
| 5,526,523 | * 6/1996 | Straub et al. | 709/328 |
| 5,572,590 | 11/1996 | Chess | 713/200 |
| 5,572,675 | * 11/1996 | Bergler | 709/328 |
| 5,602,982 | * 2/1997 | Judd et al. | 345/326 |
| 5,613,002 | 3/1997 | Kephart et al. | 713/200 |
| 5,636,371 | * 6/1997 | Yu | 703/26 |
| 5,706,453 | * 1/1998 | Cheng et al. | 345/347 |
| 5,708,774 | * 1/1998 | Boden | 714/38 |

(List continued on next page.)

OTHER PUBLICATIONS

IBM Corporation; "Implementation of Common User Access Controls under AIX Motif Environment". IBM Technical Disclosure Bulletin, vol. 36, iss 3, pp. 163–164, Mar. 1993.*

Ito et al., "A hardware/Software Co–stimulation Environment for Micro–processor Design with HDL Simulator and OS interface". IEEE/IEE Electronic Library[online], Proceedings of the ASP–DAC '97 Asia and South Pacific Design Automation Conference, Jan. 1997.*

Fleet et al., "Automated Validation of Operational Flight Programs (OFPs) and Flight Training Simulators". IEEE/IEE Electronic Library[online], Proceedings of the IEEE'94 National Aerospace and Electronics Conference, Jan. 1997.*

*Primary Examiner*—Mark R. Powell
*Assistant Examiner*—Kelvin E. Booker
(74) *Attorney, Agent, or Firm*—Ohlandt, Greeley, Ruggiero & Perle, L.L.P.; David M. Shofi, Esq.; IBM Corporation

(57) ABSTRACT

A computer application program subsystem (100) includes a program interpreter (120) and an application program interface (API 110) through which an external program requests an execution of a program of interest, such as a macro, in a specified simulated environment. The external program that requests the execution of the program of interest may further specify a simulated application state. The program of interest is written in a program language that the interpreter can interpret. The subsystem further includes an output path for returning to the external program at least one indication of what action or actions the program of interest would have taken if the program of interest had been run in a real environment that corresponds to the specified simulated environment. The output path may be implemented using a callback function that is triggered upon the occurrence of an instruction of the program of interest satisfying at least one notification criterion, and/or upon the occurrence of the program of interest satisfying at least one termination criterion. The methods and apparatus can be useful in detecting an occurrence of viral behavior in a macro by interpreting the macro in the specified virtual environment and virtual application state, and then notifying the external program when the macro performs some predetermined activity, such as writing data to some predetermined region of system memory.

20 Claims, 3 Drawing Sheets

U.S. PATENT DOCUMENTS

| | | | |
|---|---|---|---|
| 5,734,865 | * | 3/1998 | Yu .................................................. 709/250 |
| 5,734,907 | * | 3/1998 | Jarossay et al. .......................... 717/8 |
| 5,754,760 | * | 5/1998 | Warfield ................................. 714/38 |
| 5,790,117 | * | 8/1998 | Halviatti et al. ..................... 345/333 |
| 5,835,089 | * | 11/1998 | Skarbo et al. ........................ 345/335 |
| 5,860,010 | * | 1/1999 | Attal ......................................... 717/6 |
| 5,920,725 | * | 7/1999 | Ma et al. ................................ 717/11 |
| 5,922,054 | * | 7/1999 | Bibayan ................................ 709/328 |
| 5,961,582 | * | 10/1999 | Gaines ................................... 709/328 |
| 5,974,256 | * | 10/1999 | Matthews et al. ........................ 717/5 |
| 6,026,238 | * | 2/2000 | Bond et al. ............................... 717/5 |
| 6,067,639 | * | 5/2000 | Rodrigues et al. ..................... 714/38 |
| 6,096,095 | * | 8/2000 | Halstead ................................... 717/5 |
| 6,101,607 | * | 8/2000 | Bachand et al. ..................... 709/328 |
| 6,108,799 | * | 8/2000 | Boulay et al. ......................... 714/38 |

* cited by examiner

INTERPRETER WITH VIRTUALIZED INTERFACE

FIELD OF THE INVENTION

This invention is generally directed to computer software and, in particular, to a class of computer programs known as interpreters.

BACKGROUND OF THE INVENTION

As data processing systems become more powerful, more complex, and more highly interconnected, interpreted languages of various kinds are growing in importance. In non-interpreted languages, source programs are converted into the machine language for some particular CPU, and then stored, transmitted and executed in machine-language form. Computer programs that perform this function are typically referred to as compilers.

However, when using a computer program known as an interpreter the source programs are stored, transmitted and executed in a higher-level language. The interpreter is required at execution time to read the source program and carry out the instructions that it contains.

Interpreted languages tend to execute slower than other types of languages. That is, an interpreted source program may execute more slowly than the same source program that has been previously compiled into the machine code of the host CPU. However, the use of interpreters provides several advantages, including an ability to execute the same program on many different CPUs and operating systems (as long as each CPU and operating system has an interpreter for the language).

Interpreters are often embedded inside application program subsystems. For example, one widely used word processing program contains an interpreter for a specific language in which the word processor macros are written. The LotusNotes™ product contains an interpreter for LotusScript™, one of the languages in which LotusNotes™ macros are written. Also, several Web browsers contain interpreters for Java™, a language in which programs of various kinds are written, and made available on the World Wide Web (WWW). In many cases, these application program subsystems include application programming interfaces (APIs) which allow other programs to interact with the application program subsystem. One common feature offered by many APIs is the ability for an external program to access, create and execute programs written in the application program subsystem's interpreted language.

There are various types of programs, including anti-virus programs and general security programs, which may need to examine interpreted programs designed for application program subsystems. For a variety of purposes, such an external program may need to determine at least a subset of the actions that a given interpreted-language program would take, if it were to be executed by the interpreter contained in some application subsystem. Since existing APIs do not provide powerful features to allow this determination, designers of these external programs are faced with the choice of either implementing at least a subset of the interpreters themselves, or not supporting detailed examination of programs written for these interpreters. The former course of action is difficult, as implementing an interpreter for a powerful macro language can be costly and time-consuming, and it is not easy to ensure that the implemented interpreter actually behaves as the real one would in all relevant cases. The latter course of action is dangerous, as it may lead to exposure to viruses or security attacks.

SUMMARY OF THE INVENTION

This invention is directed to software interpreters. Specifically, the teachings of this invention are directed to providing a software interpreter within an application subsystem, and includes a virtualized interface to external programs for the evaluation of their behavior within the subsystem.

For security, virus detection and other purposes, external programs may need to determine what a given program would do if executed under a given interpreter. With the proliferation of complex interpreted languages, it may not be feasible for each of these external programs to contain its own implementations of each interpreter. On the other hand, application programming interfaces (APIs) known in the art only allow external programs to request the interpreter to execute a program, and not to determine what the program would do it were to be executed. The present invention solves this problem by providing an interpreter with an API allowing access to a virtualized mode of the interpreter.

In a first aspect this invention provides a computer subsystem having an interpreter that supports one or more programming languages. The computer subsystem includes an application programming interface (API) through which an external program may request simulated execution of a given program, written in one of the supported languages, in a specific simulated environment. The computer subsystem may thus simulate execution of the given program that is passed to it, and return to the external program one or more indications of what actions the given program would have taken had it actually run in the application program subsystem environment.

A method is also provided for predicting the actions of a given program within an application program subsystem having an interpreter. The method includes steps of: (a) receiving an API call for prediction; (b) initializing a virtual environment based on a real environment; (c) initializing application state information; (d) interpreting instructions of the given program; and (e) altering the application state information and the virtual environment in response to the interpreting step.

A method is disclosed for exercising a macro with an application program subsystem, having a macro interpreter, so as to detect a presence of potential viral activity. The method includes the steps of: (a) making an API call with a program, the API call identifying the macro and specifying an initial virtual environment within which the macro is to be interpreted; (b) interpreting in turn individual instructions of the macro; (c) altering the virtual environment in response to interpreted instructions; and (d) notifying the program upon the occurrence of an alteration to the virtual environment that triggers a predetermined notification criterion. The step of notifying the program can also take place upon the occurrence of the interpretation of the macro triggering a predetermined termination criterion. The API call may further specify an initial virtual application state within which the macro is to be interpreted.

In accordance with a further aspect of this invention there is provided a system and a method for executing a macro with a data processing system. The method includes a first step of generating an application program interface (API) call for interpreting a macro of interest in a virtual environment so as to execute all or a part of the macro of interest in the virtual environment. The step of generating includes a step of defining the virtual environment, wherein the virtual environment is defined at least in part through the use of at least one callback function that is invoked upon an occurrence of a virtual execution of the macro satisfying a predetermined callback function invocation criterion. The step of generating further includes a step of initializing state information. A next step of the method interprets in turn individual instructions of the macro, and alters at least one of the state information and the virtual environment in response to interpreted instructions.

The predetermined callback function invocation criterion can be, by example, an interpreted macro instruction attempting to perform file I/O, or attempting to access memory, or attempting to access a predetermined portion of a mass memory device.

The virtual environment includes simulated physical and logical devices that are either all present as real physical and logical devices in the data processing system, or that are not all present as real physical and logical devices in the data processing system.

BRIEF DESCRIPTION OF THE DRAWING

Further objects, features, and advantages of the present invention will become apparent from a consideration of the following detailed description of the invention when read in conjunction with the attached drawing figures, wherein.

DETAILED DESCRIPTION OF THE INVENTION

The present invention includes an improved application subsystem that provides an API that includes a "virtualized" interface to an interpreter. The virtualized interface allows external programs to determine what a given program in the interpreted language would do, were it to be run on the interpreter in a certain environment. By providing the API, an application subsystem can enable external programs to more easily examine programs written for its interpreter, and thus allow enhanced virus protection and security programs to be written to support its interpreter.

One important aspect of the teaching of this invention is an interface whereby an external program can describe to the subsystem at least: (1) a program written for the subsystem's interpreter (the "macro") to be executed (or partially executed) in a virtual mode, (2) a state of the external environment to be simulated during virtual execution of the macro, and (3) a set of conditions under which virtual execution of the macro should halt.

The macro itself will typically be provided in the form of the text of the program, either in a buffer, in a file whose name is passed via the API, or in some other form that will enable the subsystem to find and load the macro. Parts of the description of the environment may be in the form of callback routines, provided by the external program, which the subsystem will invoke whenever the virtual execution of the macro requires some data from the outside world, or when the virtual execution of the macro takes some action that would effect the outside world. Other parts of the description of the environment may be in the form of normal binary data.

As employed herein a callback can be implemented by passing a pointer to a function that will execute upon the occurrence of some event or condition. As but one example, the API can pass the interpreter a pointer to a routine that is executed whenever the virtual interpretation of the macro results in an attempt to perform file I/O.

Figure 1:
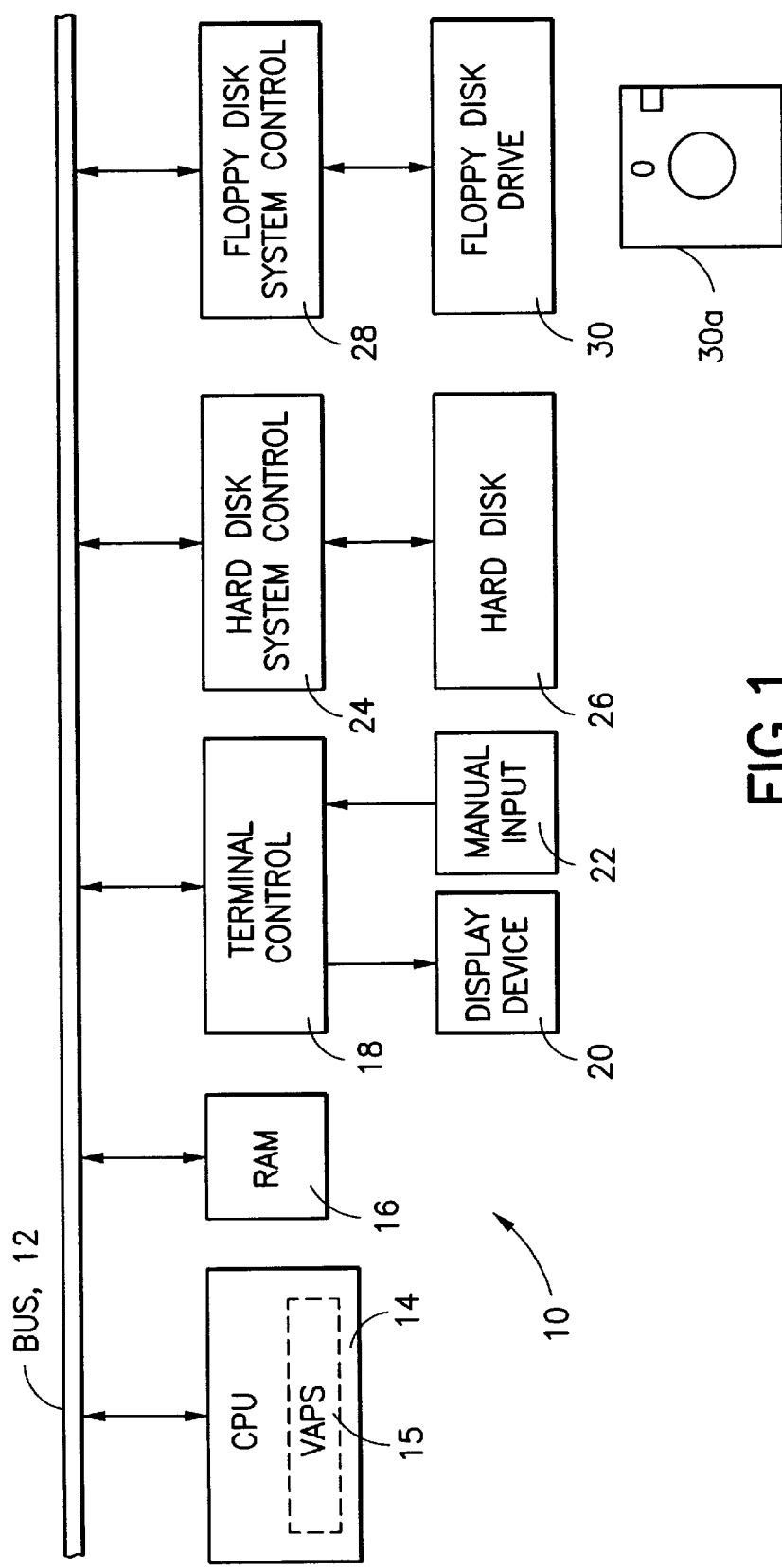
FIG. 1 is a circuit block diagram of the hardware environment to which the present invention can be applied.

FIG. 1 is a block diagram of a system 10 that is suitable for practicing the teaching of the present invention. A bus 12 is comprised of a plurality of signal lines for conveying addresses, data and controls between a central processing unit (CPU) 14 and a number of other system bus units. A random access memory (RAM) 16 is coupled to the system bus 12 and provides program instruction storage and working memory for the CPU 14. A terminal control subsystem 18 is coupled to the system bus 14 and provides outputs to a display device 20, typically a CRT monitor, and receives inputs from a manual input device 22, such as a keyboard or pointing device. A hard disk control subsystem 24 bidirectionally couples a rotating fixed storage medium, such as a hard disk 26, to the system bus 12. The control 24 and hard disk 26 provide mass storage for CPU instructions and data. A removable medium control subsystem, such as a floppy disk system control 28 along with a floppy disk drive 30, is useful as an input means in the transfer of computer files from a floppy diskette 30a to system memory via the system bus 12.

The components illustrated in FIG. 1 may be embodied within a personal computer, a portable computer, a workstation, a minicomputer or a supercomputer. As such, the details of the physical embodiment of the data processing system 10, such as the structure of the bus 12 or the number of CPUs 14 that are coupled to the bus, is not crucial to the operation of the present invention, and is not described in further detail below.

In accordance with this invention the system 10 further includes a Virtualized Application Program Subsystem (VAPS) 15, shown for convenience as forming part of the CPU 14. The VAPS 15 includes one or more interpreter programs capable of executing source programs, also referred to herein as macros, in the virtualized mode referred to above and described in further detail below. By example only, the source program may be a program that is suspected of containing a computer virus, or may be a "new" program that is to be tested to determine if it exhibits any viral characteristics or virus-type behavior. By defining a virtual environment within which the source program is to be interpreted, and then actually interpreting the source program in the virtual environment, the effect of the program's execution can be determined in a relatively "safe" mode, wherein any viral activity or characteristics can be readily ascertained. By example, if it is found that the source program unexpectedly attempts to access a virtualized mass storage medium, and/or to create one or more copies of itself in a region of virtualized memory, or in a virtual file, then the external program can be informed of the potentially viral nature of the source program.

It should be noted that the defined virtual environment need not correspond to the actual or real environment of the host computer system 10. By example, the system 10 could be a multi-processor, high performance super-computer, while the defined virtual environment corresponds to a single processor, portable (laptop) personal computer. In a similar vein, the system 10 could be typical desktop single processor personal computer, while the simulated virtual environment may correspond to a multi-processor workstation.

Figure 2:
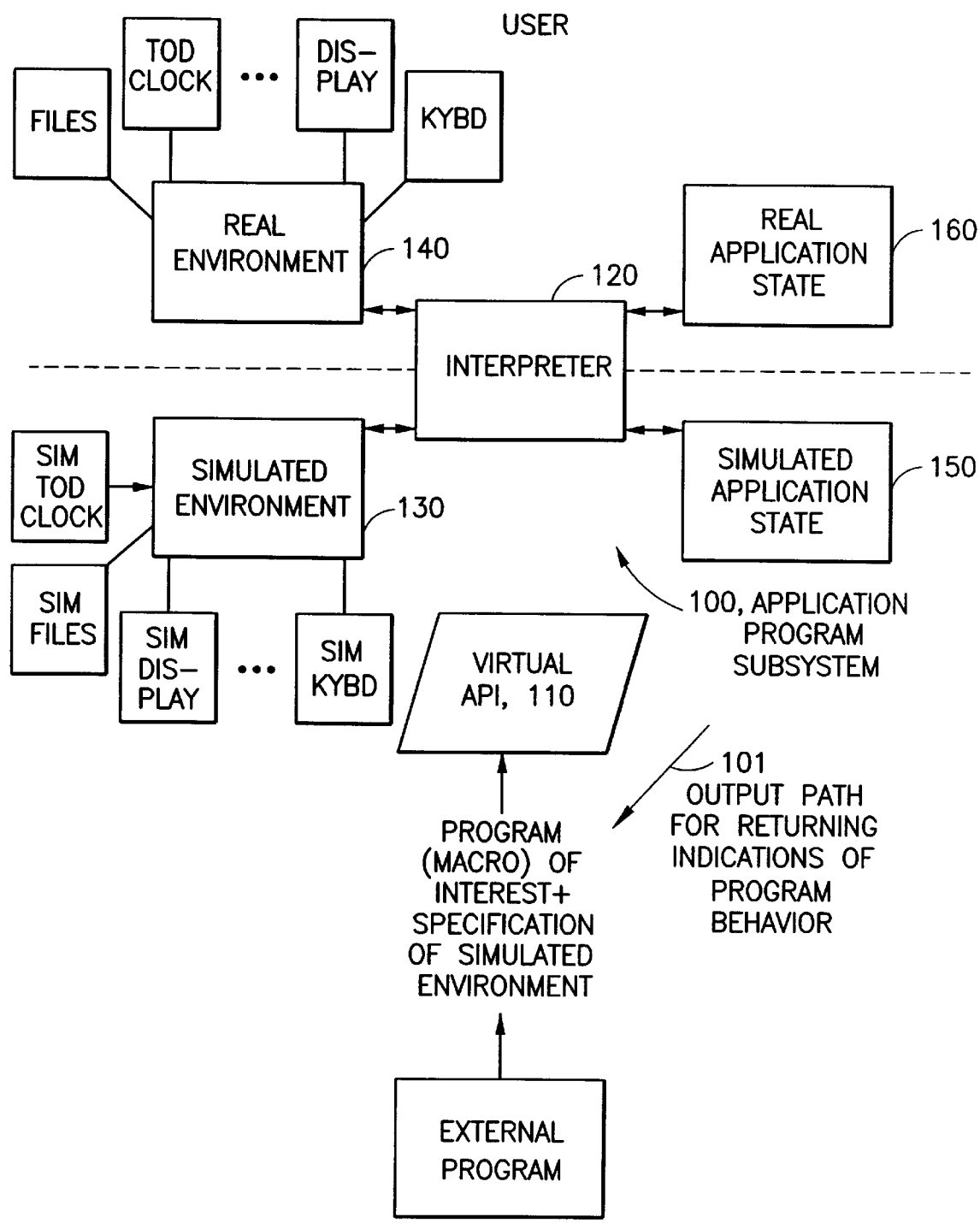
FIG. 2 is a conceptual block diagram of the software environment of the present invention.

The preferred software environment of the present invention (the VAPS 15 of FIG. 1) is shown in FIG. 2. The preferred software environment includes an application program subsystem 100 and a virtual API 110. At least one interpreter program 120 is provided to interface with a simulated or virtual environment 130, a real environment 140, a simulated or virtual application state 150, and a real application state 160. The real environment 140 will typically include a plurality of logical and physical devices such as files, a time-of-day (TOD) clock, an output device such as the display 20, a manual input device such as a keyboard and/or a mouse, communication port(s), etc. The simulated environment 130 may include the same set of logical and physical devices as the real environment 140, or a sub-set of these devices, or a different set of simulated devices altogether. As but one example, one of the simulated devices may be a special purpose interface to a machine that is controlled by the program being interpreted on a general purpose computer system 10 that does not include such an interface.

A program of interest, such as a macro written in a language that the interpreter is capable of interpreting, is passed through the virtual API 110 from an external program (i.e., a program that exists outside of the application program subsystem 100.) The external program typically will also provide a specification of the simulated environment 130, and may also provide a specification of the simulated application state 150. Callback routines, notification criteria, and termination criteria, as described below, are also typically passed through the virtual API 110 from the external program. An output path 101 exists for providing indications of macro behavior from the application program subsystem 100 to the external program. The callback routines may use the output path 101, which may form a part of the API 100.

As but one example, a relatively simple data structure that may serve as a specification of a macro and its environment is as follows:

<a record containing a string with the name of the file to load the macro from; followed by a number indicating the maximum number of instructions the interpreter should execute before returning; followed by pointers to callback functions to be called when the macro attempts to read or write a file, or determine what files exist>.

The simulated application state can be specified in whatever way is deemed optimum for a given application. For example, callbacks would be passed as function pointers (or method references in an object-oriented system), and things such as virtual time and date are passed in a conventional format for representing the time and date, and certain parameters, such as those descriptive of how large the virtual hard disk would be, can be represented as integer numbers, and so on.

Figure 3:
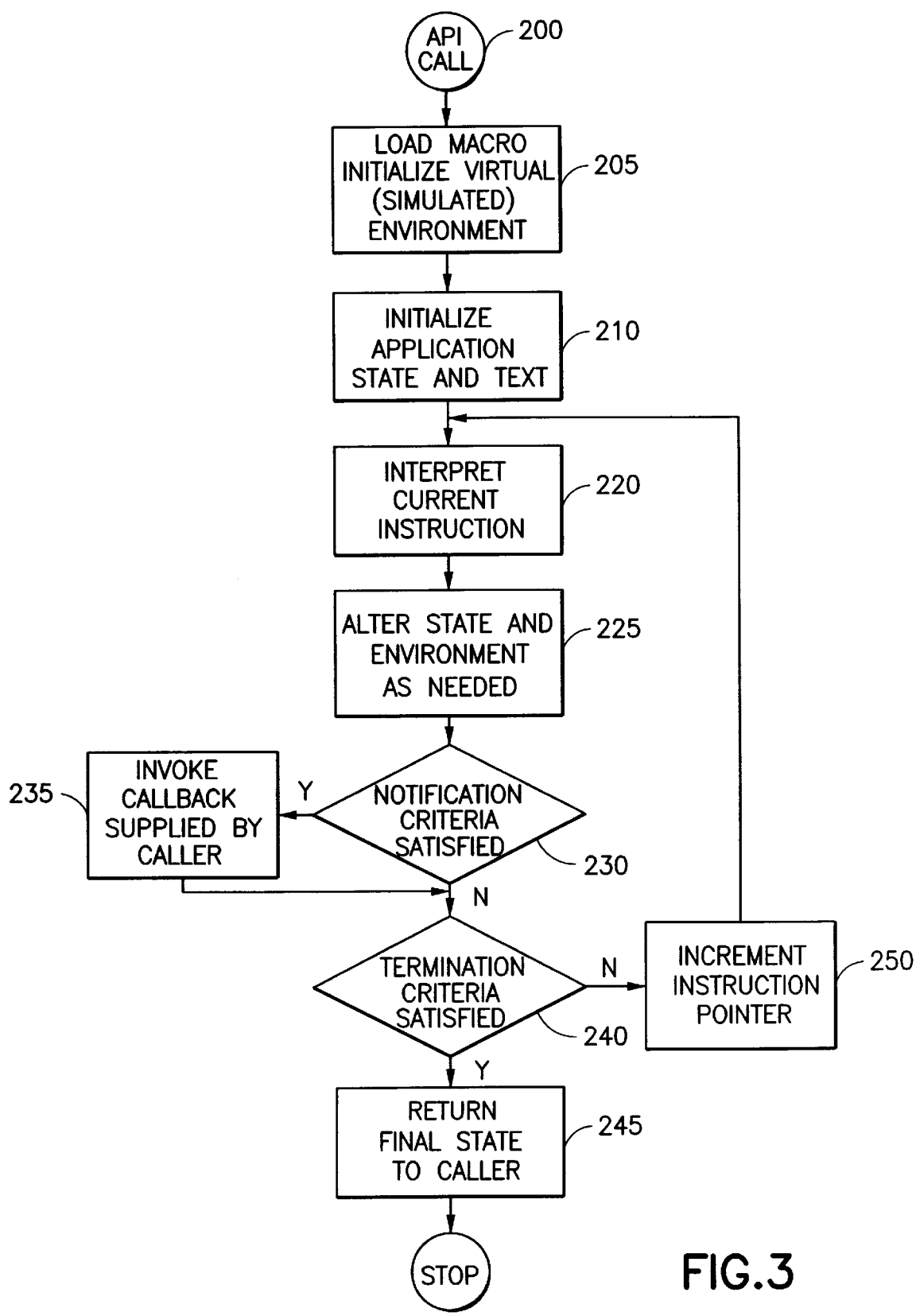
FIG. 3 is a logic flow diagram of an embodiment of the present invention.

In an exemplary implementation of this invention, the application program subsystem 100 executes the steps as shown in FIG. 3. In step 200, a request for virtual execution is received by the application subsystem 100 via the API 110. Next, in step 205, the application program subsystem 100 locates and loads the macro to be simulated, and initializes the virtual or simulated environment 130, all in accordance with information received with the API call of step 100. The virtual environment 130 is a simulation of all the relevant parts of the real environment 140, as well as any other required logical or physical devices. In this case variables and data areas in the virtual environment 130 represent resources such as the keyboard 22, the display 20, the time-of-day (TOD) clock, the file system, and any other system resource that a macro may read and/or attempt to alter. The virtual environment 130 may be initialized to a standard, default state, or it may be set according to parameters passed in from the external program via the virtual API 110.

In step 210, the application program subsystem 100 also initializes a simulated application state 150 which the macro will interact with, if one applies. The simulated application state 150 is a simulation of the real application state 160. For example, and when simulating a word processing macro, a simulation of the applicable word processor application environment, having variables such as a current page, current line number, current font, etc., are initialized. After loading the macro to be simulated and initializing the virtual environment 130 and the virtual application state 150, the interpreter 120 of the application program subsystem 100 begins in step 220 to run the macro by interpreting the current instruction (starting at the first instruction). At step 225 the interpreter 120 alters the simulated environment and the simulated application state as required by the execution of the instruction. For example, if the current program instruction reads a character from the simulated keyboard or the simulated I/O port, then a character is provided. If necessary, the simulated application state is changed as well. As but one example, if the newly inputted character would cause a simulated text buffer to exceed one full page of text, then the current page number of the simulated application state would be incremented by one, while the current line number would be reset to point to the first line of next page. In other words, whenever a macro instruction requires access to any resource that is being simulated, the subsystem 100 provides information to the macro from, or makes alterations to, the corresponding part of the virtual environment 130 instead, and if required the simulated application state is changed as well.

The application program subsystem 100 may also allow for callbacks to routines supplied via the API 110 from the external program. An external program might specify, for instance, that if the macro being simulated attempts to read data from a file (i.e. perform file I/O), a routine specified by the external program should be called (the callback routine) to determine what data the simulated read operation should return. In this case the external program that supplies the macro to be simulated, and the application program subsystem 100, cooperate in simulating the virtual environment within which the macro is interpreted. In general, such conditions are checked in step 230, wherein a determination is made if the execution of the current line of the macro being simulated has caused some external program notification criteria to be satisfied.

In general, an external program supplies a pointer to at least one callback routine through the API, and which may cause a termination of the virtual execution of the macro of interest by returning a particular result value.

In general, during each step of the simulation the application program subsystem 100 determines what interaction (s) the macro has had with the simulated environment 130, and provides that information to the caller of the API 110, either via callbacks as simulation proceeds (step 235), or via a return code or other report when the simulation terminates (step 245). The simulation terminates when a caller-specified condition occurs (e.g., some predetermined number of lines of code have been executed), when a callback function supplied by the caller indicates that simulation should terminate, or when the macro being simulated terminates. All of these conditions may be referred to as termination criteria, which are checked at step 240. If the termination criteria are not satisfied, the control passes to step 250 to increment or otherwise change the macro instruction pointer, followed by a return to step 220 to interpret the next macro instruction that is now being pointed to.

As was made evident earlier, the macro being executed in the virtual environment and virtual application state may be suspected of harboring a macro virus, or may be a macro that is simply being exercised to verify that it does not cause any viral activity or manifestations. For example, if the execution of the macro results in a request to make a write access to disk or to main memory, then the external program can be made aware of the request through a callback, and can also be made aware of what data was actually written to the simulated disk or main memory. If the data that was written is discovered to be, for example, a copy of all or a portion of the macro, then this may be an indication of viral activity by the macro that is being interpreted in the virtual environment.

This invention thus provides a mechanism for an application program subsystem that includes a program interpreter, such as a macro interpreter, as well as an application program interface, to receive a macro to be interpreted through the API, as well as a specification of a virtual environment within which to execute the macro. The virtual environment specification could be provided as a data structure that specifies device names to be simulated, as well as characteristics of the simulated devices. The characteristics could be, by example, the size and address range of a memory buffer; the size, address range and interrupt numbers and levels associated with a disk; an I/O port type, address range, interrupt numbers and levels, and also protocol; the format of data output from a TOD clock device, as well as the address location of the device, etc. The virtual environment could as well be defaulted to be identical to the real environment of the computer system on which the application program subsystem and API reside. Through the use of callbacks the external program supplying the macro and virtual environment specification can be notified of every attempt by the macro to access a virtual resource, or the external program can be notified of a request to access only specific virtual resources or portions of a virtual resource (e.g., an attempt to write to or read from a specific range of main memory addresses or disk sectors). Any data written or read by the macro can also be captured and supplied to the external program for subsequent analysis.

In the simulation of resources, particularly those having real-time or time-critical characteristics, it is preferred that adjustments be made to accommodate for any changes in timing due to the simulation of the resource. For example, if the simulation of the TOD clock results in the clock actually running slower than the real TOD clock, then adjustments are made to bring the performance of the virtual TOD clock into agreement with the real TOD clock.

It should be realized that the APS 100, as well as the interpreter 120, the simulated environment 130, the simulated application state, the virtual API 110, as well as any other logical structures of interest, may all be provided as one or more computer programs that are embodied on a computer-readable medium, such as the hard disk 26, the removable disk 30a, a volatile or a non-volatile memory, and/or any other suitable computer-readable medium.

While the invention has been particularly shown and described with respect to preferred embodiments of methods and apparatus thereof, it will be understood by those skilled in the art that changes in form and details may be made therein without departing from the scope and spirit of the invention.

What is claimed is:

1. A computer application program subsystem, comprising:
   a program interpreter; and
   an application program interface (API) through which an external program requests an execution of a program of interest in a specified simulated environment, the program of interest being written in a program language that the interpreter can interpret, said computer application program subsystem further comprising an output path for returning to the external program at least one indication of what action or actions the program of interest would have taken if the program of interest had been run in a real environment that corresponds to the specified simulated environment.

2. A computer application program subsystem as in claim 1, wherein said output path is implemented using a callback function that is triggered upon the occurrence of an execution of an instruction of the program of interest satisfying at least one notification criterion.

3. A computer application program subsystem as in claim 1, wherein the external program supplies a pointer to at least one callback routine through said API, and which can cause a termination of the virtual execution by returning a particular result value.

4. A computer application program subsystem as in claim 1, wherein the external program that requests the execution of the program of interest further specifies a simulated application state.

5. A method for predicting the action of a program of interest within an application program subsystem having an interpreter, the method comprising the steps of:
   receiving an application program interface (API) call for predicting the action of a program of interest;
   initializing a virtual environment based on a real environment within which the program of interest is expected to operate;
   initializing application state information;
   interpreting in turn individual instructions of the program of interest; and
   altering the application state information and the virtual environment in response to interpreted instructions.

6. A method as in claim 5, wherein the step of receiving receives the API call from an external program, and further comprising a step of returning to the external program at least one indication of what action or actions the program of interest would have taken if the program of interest had been run in the real environment.

7. A method as in claim 5, wherein the step of receiving receives the API call from an external program, and further comprising a step of executing a callback function to the external program for returning at least one indication of what action or actions the program of interest would have taken if the program of interest had been run in the real environment, the execution of the callback function being triggered upon the occurrence of an instruction of the program of interest satisfying at least one notification criterion.

8. A method as in claim 5, wherein the step of receiving receives the API call from an external program, and further comprising a step of executing a callback function to the external program for returning at least one indication of what action or actions the program of interest would have taken if the program of interest had been run in the real environment, the execution of the callback function being triggered upon the occurrence of the program of interest satisfying a predetermined callback criterion.

9. A method for exercising a macro with an application program subsystem having a macro interpreter so as to detect a presence of potential viral activity, comprising steps of:

making an application program interface (API) call with a program, the API call identifying the macro and specifying an initial virtual environment within which the macro is to be interpreted;

interpreting in turn individual instructions of the macro;

altering the virtual environment in response to interpreted instructions; and notifying the program upon the occurrence of an alteration to the virtual environment that triggers a predetermined notification criterion, wherein the alteration may be indicative of a presence of potential viral activity.

10. A method as in claim 9, and further comprising a step of notifying the program upon the occurrence of the interpretation of the macro triggering a predetermined termination criterion.

11. A method as in claim 9, wherein the API call further specifies an initial virtual application state within which the macro is to be interpreted.

12. A method as in claim 9, wherein the virtual environment is comprised of simulated logical and physical devices.

13. A method as in claim 9, wherein the method is executed on a host computer, and wherein the virtual environment is comprised of simulated physical and logical devices that are all present as real physical and logical devices in the host computer.

14. A method as in claim 9, wherein the method is executed on a host computer, and wherein the virtual environment is comprised of simulated physical and logical devices that are not all present as real physical and logical devices in the host computer.

15. A method for executing a macro with a data processing system, comprising the steps of:

generating an application program interface (API) call for interpreting a macro of interest in a virtual environment so as to execute all or a part of the macro of interest in the virtual environment;

the step of generating including a step of defining the virtual environment, wherein the virtual environment is defined at least in part through the use of at least one callback function that is invoked upon an occurrence of a virtual execution of the macro satisfying a predetermined callback function invocation criterion;

wherein the step of generating further includes a step of initializing state information;

interpreting in turn individual instructions of the macro; and altering at least one of the state information and the virtual environment in response to interpreted instructions.

16. A method as in claim 15, wherein the predetermined callback function invocation criterion is comprised of an interpreted macro instruction attempting to perform file I/O.

17. A method as in claim 15, wherein the predetermined callback function invocation criterion is comprised of an interpreted macro instruction attempting to access memory.

18. A method as in claim 15, wherein the predetermined callback function invocation criterion is comprised of an interpreted macro instruction attempting to access a predetermined portion of a mass memory device.

19. A method as in claim 15, wherein the virtual environment is comprised of simulated physical and logical devices that are either all present as real physical and logical devices in the data processing system, or that are not all present as real physical and logical devices in the data processing system.

20. A computer program executable by a computer and embodied on a computer-readable medium for providing a computer application program subsystem, comprising:

a program interpreter code segment; and an application program interface (API) code segment through which an external program requests an execution of a program of interest in a specified simulated environment, the program of interest being written in a program language that the interpreter code segment can interpret, said computer application program subsystem operating so as to return to the external program at least one indication of what action or actions the program of interest would have taken if the program of interest had been run in a real environment that corresponds to the specified simulated environment.

* * * * *